No. 698,656. Patented Apr. 29, 1902.
T. DUNCAN.
INDUCTION MOTOR METER.
(Application filed Sept. 18, 1899. Renewed Dec. 16, 1901.)
(No Model.)

Witnesses:
Max Zabel.
Chas. J. Schmidt

Inventor:
Thomas Duncan.
By Charles A. Brown Bragg
Attorneys

UNITED STATES PATENT OFFICE.

THOMAS DUNCAN, OF CHICAGO, ILLINOIS, ASSIGNOR TO THE SIEMENS & HALSKE ELECTRIC COMPANY OF AMERICA, OF CHICAGO, ILLINOIS, A CORPORATION OF ILLINOIS.

INDUCTION MOTOR-METER.

SPECIFICATION forming part of Letters Patent No. 698,656, dated April 29, 1902.

Application filed September 18, 1899. Renewed December 16, 1901. Serial No. 86,054. (No model.)

*To all whom it may concern:*

Be it known that I, THOMAS DUNCAN, a citizen of the United States, residing at Chicago, in the county of Cook and State of Illinois, have invented a certain new and useful Improvement in Induction Motor-Meters, (Case No. 271,) of which the following is a full, clear, concise, and exact description, reference being had to the accompanying drawings, forming a part of this specification.

My invention relates to an improvement in induction motor-meters, and has for its object the provision of a meter that will readily and accurately measure the so-called "wattless" component of a central-station output.

The construction and arrangement of the meter of my present invention are based upon the same principles as those set out in my application, Serial No. 730,847, filed September 18, 1899, and is a modification and development of the invention set forth in said application.

It is necessary in order to secure an accurate measurement of the magnetizing or wattless current of a central-station output with an induction motor-meter that when there is a non-inductive load—that is to say, when the current is in phase with the impressed electromotive force—there should be no movement of the revoluble armature if an integrating instrument is used, or the pointer should rest at zero in the case of an indicating-meter. It is further necessary that there should be a torque exerted upon the movable element of the meter, which varies as the sine of the angle of lag when there are inductances in circuit which cause a lag of the current behind the impressed electromotive force. An instrument which will accomplish these two essentials and which, further, has the capacity of adjustment to secure these results is provided by my present invention.

I will explain the construction and arrangement of this invention by reference to the accompanying drawings, in which—

Figure 1:
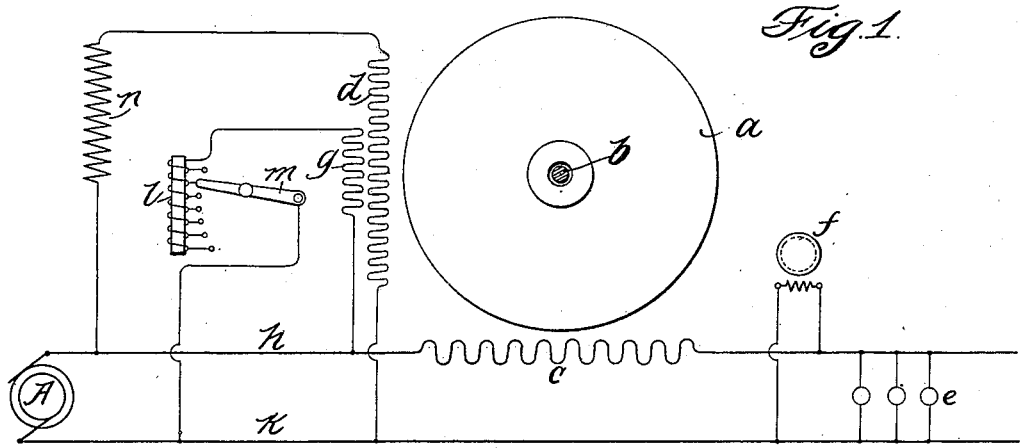
Figure 2:
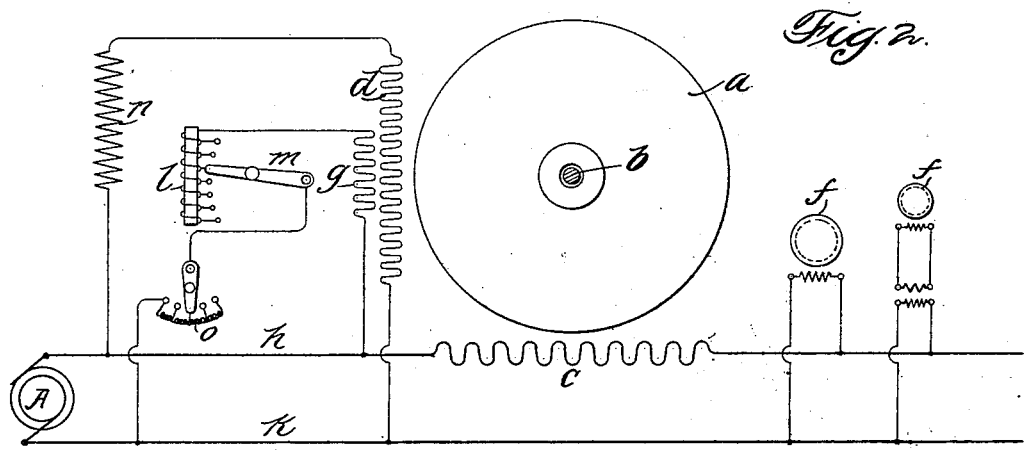
Figure 3:

Figure 1 shows diagrammatically the field-windings of the induction motor-meter and their circuit connections with the alternating-current system. Fig. 2 is a similar diagrammatic view showing a modification of the means of securing adjustment. Fig. 3 is a vector diagram showing the relations of the currents in the circuits of my invention.

Like parts are represented by similar letters of reference in the different figures.

The armature $a$ is shown as rotatably mounted upon its spindle $b$, and in inductive relation therewith are the series winding $c$ and the shunt-winding $d$, connected with the leads of the alternating-current generator A, which is represented as furnishing current to the non-inductive load $e$ and the inductive load $f$. Associated with the shunt-winding $d$ is the auxiliary shunt-winding $g$, connected with the leads $h\ k$, but reversely to the connections of the circuit including the winding $d$, so that the auxiliary circuit carries current in opposition to that flowing in winding $d$. In circuit with the winding $g$ is the impedance-coil $l$, arranged by means of the switch-arm $m$ to have more or less of its winding connected in circuit. Non-inductive resistance $n$ is connected in circuit with the main shunt-winding $d$.

The operation of this meter will be readily understood by those skilled in the art. Due to the self-induction of the winding $d$ the current therethrough will be lagging in phase behind the impressed electromotive force of the circuit $h\ k$. By means of the non-inductive resistance $n$ the phase of the current in this circuit may be advanced, but not to the point where it will be in phase with the impressed electromotive force. The current flowing in the auxiliary circuit including the winding $g$ will have a phase which is one hundred and eighty degrees in advance of the impressed electromotive force plus the angle of lag due to the inductance in that auxiliary circuit. By adjusting the impedance in the auxiliary circuit, as may be done by shifting the arm $m$ over the contacts which include more or less of the convolutions of the impedance-coil $l$, the phase of this auxiliary circuit may be modified, so that a resultant of the current-phase relations of the two circuits including the windings $g$ and $d$ will be in phase with the impressed electromotive force and no torque will be exerted upon the armature $a$ when there is no inductance in the circuit. When an inductive load is placed upon the line creating a magnetizing-current, the torque exerted upon the armature will vary as the sine of the angle of lag.

In Fig. 2 I have shown the same arrangement as that of Fig. 1, having added for purposes of adjustment in the auxiliary circuit the non-inductive resistance $o$, which may be used, if desired, to assist in securing and maintaining the requisite uniformity of phase between the magnetic effect of the shunt-windings and the impressed electromotive force of the circuit.

In Fig. 3 I have shown by vector diagram the relations of the phases of the currents in different circuits. The impressed electromotive force of the circuit is represented by the line 1, the current in the coil $d$ by the line 2, and that in coil $g$ by the line 3. It will readily be understood that the resultant 4 of the currents 2 and 3 will be in phase with the impressed electromotive force 1.

The various mechanical and electrical details of the meter I have not deemed it necessary to illustrate and describe, as they are well known to those skilled in the art, and my invention does not reside in these details. It will be understood that the movable element of the meter is mounted in the well-known way and adapted to give an integrating or an indicating measurement of the lagging component of the current, as is usual with induction motor-meters.

Modifications in the details of the arrangements may be made without departing from the spirit of my invention, and I therefore do not wish to be limited to the precise arrangements and devices shown; but, Having described my invention, what I claim as new, and desire to secure by Letters Patent, is—

1. In a device of the class described, the combination with a movable element, of a series and a shunt winding in inductive relation therewith, a resistance-coil in series with the said shunt-winding, and an auxiliary circuit adapted to modify the magnetic effect of said shunt-winding whereby the magnetism of said shunt-winding may be brought into uniformity with the phase of the impressed electromotive force of the circuit.

2. In a device of the class described, the combination with a movable element, of a series and a shunt winding in inductive relation therewith, and an auxiliary winding adapted to modify the magnetic effect of such said shunt-winding and to bring it in phase with the impressed electromotive force of the circuit, substantially as described.

3. In a device of the class described, the combination with an armature, of a series and a shunt winding in inductive relation therewith, a non-inductive resistance in series with said shunt-winding, and an auxiliary winding adapted to modify the magnetic effect of said shunt-winding and to bring it in phase with the impressed electromotive force in the circuit, substantially as described.

4. In a device of the class described, the combination with a movable element, of a series and a shunt winding in inductive relation therewith, a non-inductive resistance in series with said shunt-winding, an auxiliary shunt-circuit, an impedance-coil in said auxiliary shunt-circuit, and a shunt-winding also in said auxiliary circuit and adapted to modify the magnetic effect of said main shunt-winding and to bring it in phase with the impressed electromotive force of the circuit, substantially as described.

5. In a device of the class described, the combination with a movable element, of a series and a shunt winding in inductive relation therewith, an auxiliary shunt-winding adapted to carry current in opposition to said main shunt-winding, and means for adjusting the combined magnetic effects of the two shunt-windings whereby the resultant magnetic effect thereof upon the movable element is brought in phase with the impressed electromotive force of the circuit, substantially as described.

6. In a device of the class described, the combination with a movable element, of a series and a shunt winding in inductive relation therewith, a non-inductive resistance in series with said shunt-winding, an auxiliary shunt-winding carrying current in opposition to that in said main shunt-winding, and an adjustable impedance-coil in series with said auxiliary shunt-winding whereby the combined magnetic effects of the main and auxiliary shunt-windings may be brought in phase with the impressed electromotive force of the circuit, substantially as described.

7. In a device of the class described, the combination with a movable element, of a series and a shunt winding associated in inductive relation therewith, a non-inductive resistance in series with the said shunt-winding, an auxiliary shunt-winding adapted to carry current in opposition to that in said main shunt-winding, an adjustable impedance-coil, and an adjustable non-inductive resistance in series with said auxiliary shunt-winding whereby the combined magnetic effect of the main and auxiliary shunt-windings may be brought in phase with the impressed electromotive force of the circuit, substantially as described.

8. In an induction motor-meter of the class described, the combination with the armature $a$, the series winding $c$, shunt-winding $d$, of the non-inductive resistance $n$ in circuit with said shunt-winding $d$, the auxiliary shunt-winding $g$, carrying current in opposition to that in winding $d$, and an adjustable impedance-coil $l$, whereby the magnetic field due to the pressure-winding is maintained in phase with the pressure, substantially as described.

9. In an induction motor-meter of the class described, the combination with the armature $a$, the series winding $c$, the shunt-winding $d$, of the non-inductive resistance $n$ in circuit with said shunt-winding $d$, the auxiliary shunt-winding $g$, carrying current in opposition to that in winding $d$, an adjustable impedance-coil $l$, and the adjustable resistance $o$, whereby the magnetic field due to the pressure-winding is maintained in phase with the pressure, substantially as described.

In witness whereof I hereunto subscribe my name this 13th day of September, A. D. 1899.

THOMAS DUNCAN.

Witnesses:
CHARLES A. BROWN,
GEORGE L. CRAGG.